United States Patent
Yabunaka et al.

(10) Patent No.: US 11,048,288 B2
(45) Date of Patent: Jun. 29, 2021

(54) OPERATION DEVICE FOR VEHICLE

(71) Applicant: MAZDA MOTOR CORPORATION, Hiroshima (JP)

(72) Inventors: Sho Yabunaka, Hiroshima (JP); Masatoshi Takayama, Hiroshima (JP); Yusaku Takeda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 101 days.

(21) Appl. No.: 16/485,351

(22) PCT Filed: Feb. 16, 2018

(86) PCT No.: PCT/JP2018/005501
§ 371 (c)(1),
(2) Date: Aug. 12, 2019

(87) PCT Pub. No.: WO2018/155338
PCT Pub. Date: Aug. 30, 2018

(65) Prior Publication Data
US 2019/0361479 A1    Nov. 28, 2019

(30) Foreign Application Priority Data

Feb. 21, 2017  (JP) .............................. JP2017-029921

(51) Int. Cl.
*G05G 9/00* (2006.01)
*G05G 13/00* (2006.01)
(Continued)

(52) U.S. Cl.
CPC ............... *G05G 5/03* (2013.01); *B60K 35/00* (2013.01); *G05G 1/08* (2013.01);
(Continued)

(58) Field of Classification Search
CPC .. G05G 5/03; G05G 1/02; G05G 1/08; G05G 2505/00; B60K 2370/126; B60K 2370/128; B60K 35/00
See application file for complete search history.

(56) References Cited

U.S. PATENT DOCUMENTS

| | | |
|---|---|---|
| 2005/0090980 A1 | 4/2005 | Hayasaka |
| 2007/0024120 A1 | 2/2007 | Yoshida et al. |

(Continued)

FOREIGN PATENT DOCUMENTS

| | | |
|---|---|---|
| CN | 1904775 A | 1/2007 |
| CN | 105857388 A | 8/2016 |

(Continued)

OTHER PUBLICATIONS

International Search Report issued in PCT/JP2018/005501; dated May 15, 2018.

(Continued)

*Primary Examiner* — Jake Cook
(74) *Attorney, Agent, or Firm* — Studebaker & Brackett PC

(57) ABSTRACT

An operation device in which in-vehicle devices are controlled in accordance with a rotation angle of an input unit operated by a manual operation of a driver, which includes a commander rotatable about a rotation shaft, a rotation angular speed calculation unit that detects a rotation angular speed of the commander, a motor that gives an operation reaction force for each predetermined rotation angle of the commander, and an ECU that controls the operation reaction force given by the motor, wherein the ECU changes the operation reaction force in accordance with the rotation angular speed detected by the rotation angular speed calculation unit.

8 Claims, 14 Drawing Sheets

(51) Int. Cl.
  *G05G 5/03* (2008.04)
  *B60K 35/00* (2006.01)
  *G05G 1/08* (2006.01)
  *G05G 1/02* (2006.01)
(52) U.S. Cl.
  CPC .. *B60K 2370/126* (2019.05); *B60K 2370/128* (2019.05); *G05G 1/02* (2013.01); *G05G 2505/00* (2013.01)

(56) References Cited

U.S. PATENT DOCUMENTS

| | | | |
|---|---|---|---|
| 2016/0229446 A1 | 8/2016 | Tamaizumi et al. | |
| 2017/0227980 A1* | 8/2017 | Hafez | H01H 19/00 |
| 2017/0322586 A1 | 11/2017 | Shirane et al. | |

FOREIGN PATENT DOCUMENTS

| | | |
|---|---|---|
| EP | 1528458 A2 | 5/2005 |
| EP | 3130978 A1 | 2/2017 |
| JP | 2003-150261 A | 5/2003 |
| JP | 2003-335192 A | 11/2003 |
| JP | 2010-066962 A | 3/2010 |
| JP | 2011-235780 A | 11/2011 |
| JP | 2016-000581 A | 1/2016 |
| WO | 2016-016589 A1 | 2/2016 |
| WO | 2016/079988 A1 | 5/2016 |

OTHER PUBLICATIONS

An Office Action issued by the State Intellectual Property Office of the People's Republic of China dated Apr. 2, 2020, which corresponds to Chinese Patent Application No. 201880012555.4 and is related to U.S. Appl. No. 16/485,351 with English language summary.

The extended European search report issued by the European Patent Office dated Feb. 5, 2020, which corresponds to European Patent Application No. 18757562.6-1009 and is related to U.S. Appl. No. 16/485,351.

* cited by examiner

OPERATION DEVICE FOR VEHICLE

TECHNICAL FIELD

The present invention relates to an operation device for a vehicle in which an in-vehicle device is controlled in accordance with an operation amount of an input unit which is manually operated by a driver.

BACKGROUND ART

Conventionally, there has been known an operation device for a vehicle in which a selection screen for selecting operations of a plurality of in-vehicle devices (audio equipment, air conditioners, etc.) is displayed on a monitor, and the driver selects an arbitrary item from the selection screen by using an operation unit and causes the in-vehicle device to operate a function corresponding to the selected item.

In such an operation device for a vehicle, when an operation reaction force associated with a displacement of the operation unit is too small, the operation feeling is light and there is a possibility of overshooting. On the other hand, when an operation reaction force associated with a displacement of the operation unit is too large, the operation feeling is heavy, and there is a possibility of occurrence of an operation delay.

Therefore, the operation unit is controlled based on an operation reaction force characteristic capable of generating an appropriate operation feeling with respect to the driver.

For example, Patent Literature 1 discloses an operation device for a vehicle that controls an in-vehicle device in accordance with to an operation amount of a joystick-type input processing device which is operated about a rotation shaft by a manual operation of the driver. This operation device for a vehicle includes a stick portion that is rotatable about a rotation shaft, a travel state detection means for detecting a travel state of the vehicle, a reaction force application means for applying an operation reaction force to the stick portion, and a control means for controlling the operation reaction force applied by the reaction force application means. The control means changes, based on the travel state detected by the travel state detection means, an operation amount-operation reaction force amount characteristic that indicates the operation reaction force amount with respect to the operation amount of the stick portion, and sets the operation reaction force amount in accordance with the changed operation amount-operation reaction force amount characteristic.

In the technique disclosed in Patent Literature 1, the click feeling of the operation unit is increased in a high-speed travel state in which an erroneous operation on the operation unit is likely to occur, thereby preventing the driver from failing to enter.

However, in the technique of Patent Literature 1, merely the operation reaction force of the operation unit is adjusted based on an influence from the external environment such as the travel state, and the mechanical characteristic of the human limbs and the so-called viscoelastic characteristic (hereinafter referred to as muscle elasticity characteristic) of human joints, muscles, and the like are not considered. For this reason, the technique of Patent Literature 1 is not capable of providing an operation feeling that matches the operation condition (action) of the driver in terms of ergonomics.

CITATION LIST

Patent Literature

Patent Literature 1: Japanese Patent Application Publication No. 2003-335192

SUMMARY OF INVENTION

It is an object of the present invention to provide an operation device for a vehicle that is capable of optimizing an operation reaction force felt by the driver regardless of the displacement speed of the operation unit.

An operation device for a vehicle according to one aspect of the present invention is an operation device for a vehicle in which an in-vehicle device is controlled in accordance with an operation amount of an input unit which is manually operated by a driver, the operation device including: an operation unit that is displacable along a predetermined operation trajectory by a manual operation of the driver; a displacement speed detection unit that detects a displacement speed of the operation unit; a reaction force application unit that applies an operation reaction force to the operation unit for each predetermined operation amount of the operation unit; and a control unit that controls an operation reaction force applied by the reaction force application unit, wherein: the control unit changes the operation reaction force in accordance with a displacement speed that is detected by the displacement speed detection unit.

According to the present aspect, the operation reaction force felt by the driver can be optimized regardless of the displacement speed of the operation unit.

DESCRIPTION OF EMBODIMENTS (Findings Leading to the Present Invention)

The applicant of the present invention has found that in a case where the driver operates the operation unit, ergonomically, a large viscous reaction force (viscosity value) is generated with respect to the driver based on the muscle viscosity characteristic when the muscular activity of the driver is high (operation speed is high), compared to when the muscular activity is low.

The applicant of the present invention has also found that the load perceived by the driver when the driver operates the operation unit can be regarded as the sum of two reaction forces, an operation reaction force (hereinafter referred to as sensory reaction force) felt by the driver from the operation unit and a viscous reaction force that is the motion resistance of the driver.

According to the above findings, even if the operation reaction force of the operation unit is set to a certain characteristic based on the influence of an external environment as in the technique of Patent Literature 1, the driver may perceive a high sensory reaction force when the muscle activity is high, and the driver may perceive a low sensory reaction force when the muscle activity is low. Therefore, the driver may feel a sense of incongruity in the operation of the operation unit.

In particular, there are many joints involved such as finger joints and wrist joints in the operation unit operated about the rotation shaft by a manual operation, and the operation thereof is complicated. Therefore, the viscous reaction force based on the muscle viscosity characteristic has a considerable effect on the load perceived by the driver.

Based on the above findings, the applicant of the present invention has conceived of the present invention in which the operation reaction force felt by the driver can be optimized regardless of the displacement speed of the operation unit by taking into consideration the muscle viscosity characteristic of the driver.

Hereinafter, embodiments of the present invention will be described in detail with reference to the drawings.

The following description exemplifies an application of the present invention to an operation device for a vehicle, and does not limit the present invention, its application, or its use.

First Embodiment

Hereinafter, the first embodiment of the present invention will be described with reference to FIGS. 1 to 13.

First, an overall configuration of a vehicle V will be described.

Figure 1:
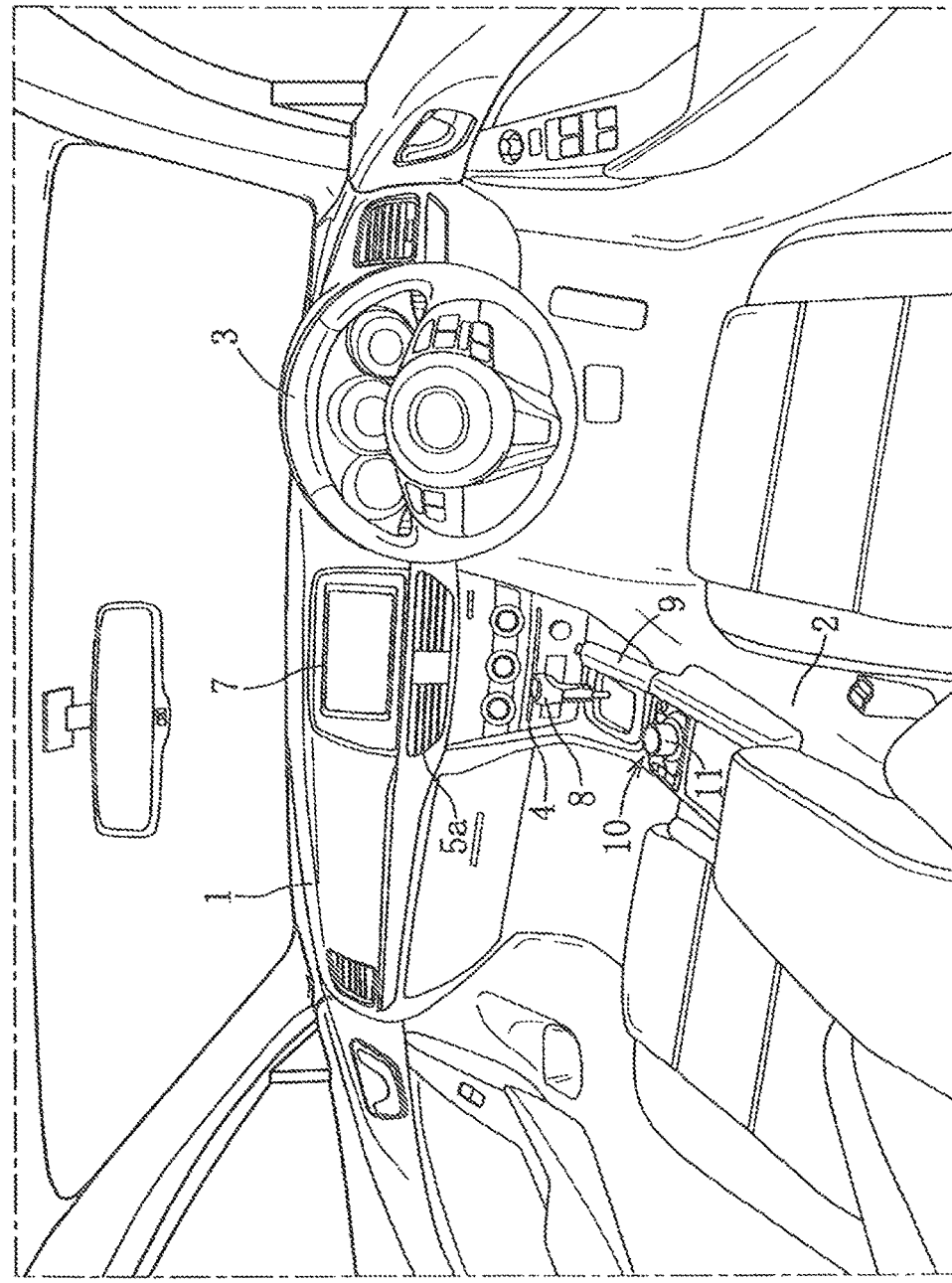
FIG. 1 is a view showing a layout of an operation device for a vehicle according to a first embodiment.

As shown in FIG. 1, the vehicle V includes an instrument panel 1 extending in a vehicle width direction, a console box 2 extending back and forth and continuing to a center portion in the vehicle width direction of the instrument panel 1, a driver seat and a steering wheel 3 arranged on the right side of the console box 2, a front passenger seat arranged on the left side of the console box 2, an operation device 10, and the like. An audio device 4 is disposed near a connection portion between the instrument panel 1 and the console box 2. An air conditioned air blowing outlet 5a of an air conditioner 5 (air conditioning device) is formed above the audio device 4.

A monitor 7 (display portion) capable of displaying various screens is disposed above the air conditioned air blowing outlet 5a. The monitor 7 is constituted with, for example, a liquid crystal monitor or the like. The monitor 7 is configured to be capable of displaying a selection screen of titles classified by categories (e.g., example, artist, genre, etc.) of the audio 4, a selection screen of various operation functions (e.g., air conditioning mode, set temperature, air flow volume, etc.) of the air conditioner 5, and a selection screen of various operation functions (e.g., a search screen, route information, peripheral map information, etc.) of a navigation system 6.

At an upper position of the console box 2 near the driver seat, a variable speed shift lever 8, a parking brake lever 9, various input system switches 11 to 17 constituting a part of the operation device 10, and the like are disposed.

Next, the operation device 10 will be described.

Figure 2:
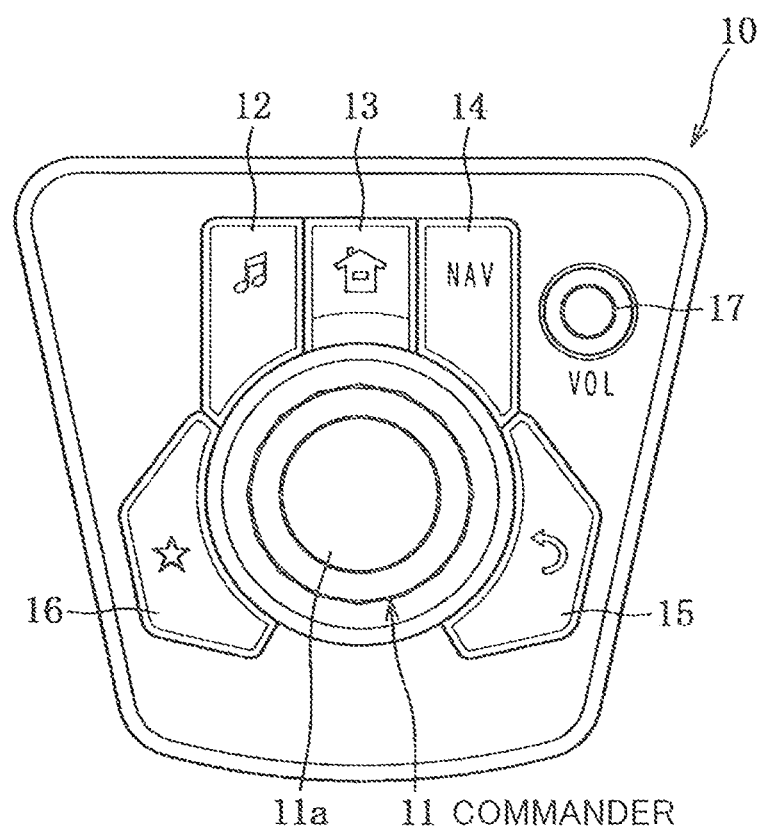
FIG. 2 is a plan view of a commander switch.
Figure 3:
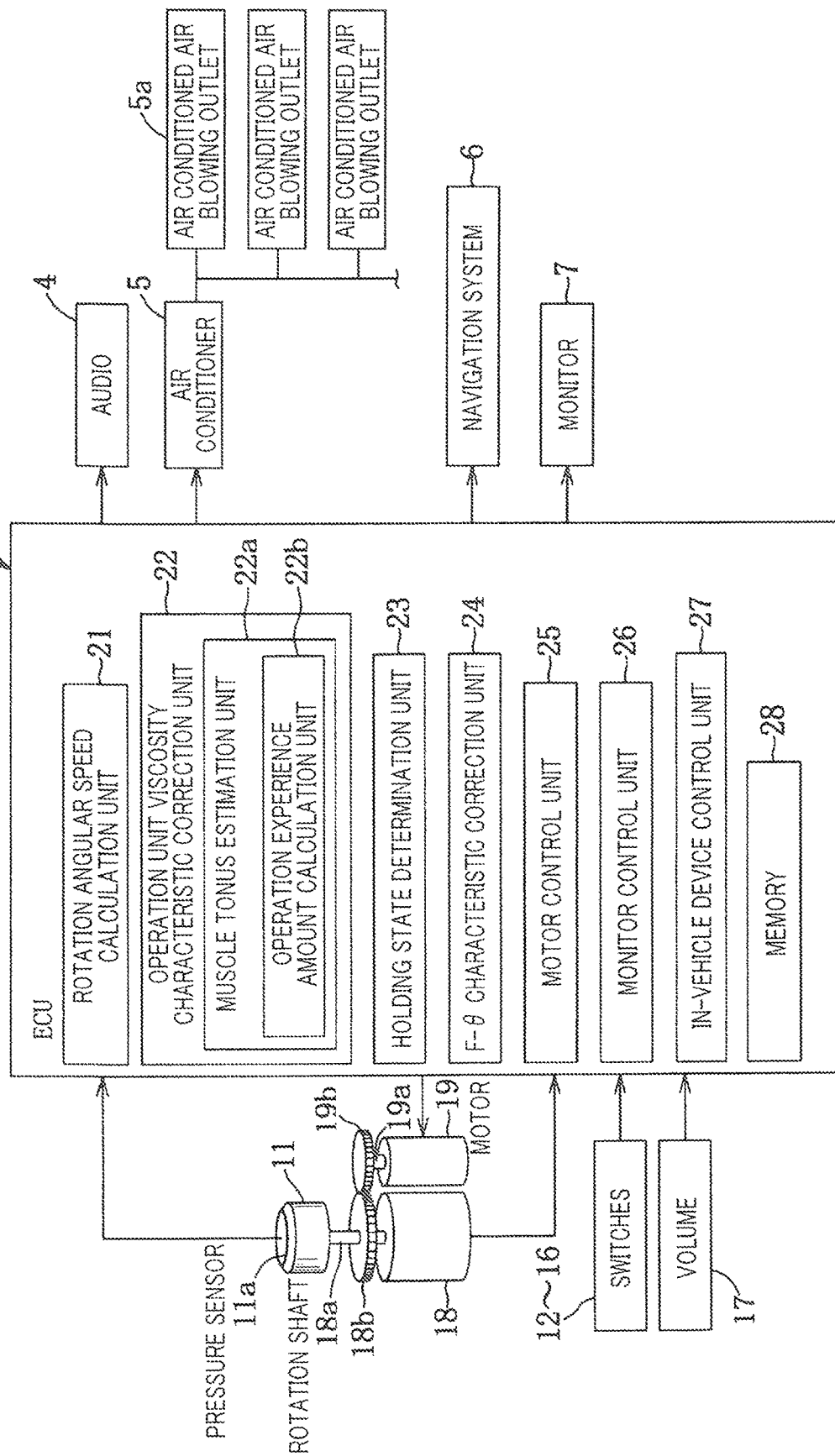
FIG. 3 is a block diagram of the operation device for a vehicle.

As shown in FIGS. 2 and 3, the operation device 10 includes an input system switch including a rotatable commander switch (hereinafter abbreviated as commander) 11 (operation unit), selection switches 12 to 14, a return switch 15, a decision switch 16, and a volume switch 17, and an ECU (electronic control unit) 20 (control unit) capable of selecting display contents of the monitor 7 and controlling the in-vehicle devices 4 to 6 in response to the operation of these input system switches.

The commander 11 is configured to be rotatable in any of the left and right directions around a rotation shaft 18a. A pressure sensor 11a is provided on the top portion of the commander 11. The commander 11 is displaced along a rotation trajectory (operation trajectory) defined about the rotation shaft 18a by a manual operation of the driver.

Using the pressure sensor 11a, it is possible to determine the holding state of the commander 11 by the driver.

When the driver holds the commander 11 from above, i.e., in an upper holding state, the palm of the driver contacts the top portion of the commander 11. Therefore, a contact pressure equal to or higher than a predetermined pressure is detected by the pressure sensor 11a. Accordingly, when a contact pressure equal to or higher than the predetermined pressure is detected by the pressure sensor 11a, it can be determined that the holding state of the commander 11 is the upper holding state.

On the other hand, when the driver holds the commander 11 from the side, i.e., in a lateral holding state, the palm of the driver does not contact the top portion of the commander 11 because the driver holds the commander 11 with his fingertips. Therefore, a contact pressure equal to or higher than the predetermined pressure is not detected by the pressure sensor 11a. Accordingly, when a contact pressure equal to or higher than the predetermined pressure is not detected by the pressure sensor 11a, it can be determined that the holding state of the commander 11 is the lateral holding state.

Instead of the pressure sensor 11a, a strain gauge or an electrode may be used.

As shown in FIG. 3, the rotation shaft 18a is integrally formed with a rotation shaft of a rotary encoder 18 provided at a position opposite to the commander 11, and a gear 18b is connected to a middle portion thereof.

A motor 19 (reaction force application portion) that gives an operation reaction force F corresponding to a manual operation by the driver to the commander 11 is provided in parallel to the rotary encoder 18. A gear 19b is connected to a rotating shaft 19a, which is an output shaft of the motor 19, and the gear 19b meshes with the gear 18b.

The pressure sensor 11a and the rotary encoder 18 are formed to be capable of outputting a detection signal to the ECU 20. The motor 19 is formed to be capable of receiving a command signal from the ECU 20.

The selection switch 12 is a switch for selecting the audio 4. The selection switch 13 is a selection switch of the air conditioner 5. The selection switch 14 is a selection switch for the navigation system 6. When any of the selection switches 12 to 14 is pressed, a menu screen of the in-vehicle device corresponding to the selection switch selected among the in-vehicle devices 4 to 6 is displayed on the monitor 7.

When pressed, the return switch 15 is capable of returning the currently displayed screen to the previously displayed screen before pressed. When pressed, the decision switch 16 is capable of executing the selected function in the selected in-vehicle device.

The volume switch 17 is a switch for adjusting the volume of sound that is output by the audio 4 or the like.

The input system switches 12 to 17 are each formed to be capable of outputting a detection signal to the ECU 20.

Next, the ECU 20 will be described.

The ECU 20 is configured to be capable of controlling the operation reaction force F applied to the commander 11 in accordance with the manual operation amount about the rotation shaft 18a by the driver of the commander 11. The operation reaction force F gives the driver the operation feeling for each predetermined rotation angle $\theta$.

The ECU 20 outputs a command signal based on a commander viscosity characteristic X and an F-$\theta$ characteristic W, which will be described later, to the motor 19.

The ECU 20 is an electronic control unit including a CPU, an ROM, and an RAM, and performs various calculation processing by loading an application program stored in the ROM into the RAM and executing the application program at the CPU.

As shown in FIG. 3, the ECU 20 includes a rotation angular speed calculation unit 21 (displacement speed detection unit), an operation unit viscosity characteristic correction unit 22, a holding state determination unit 23, an F-$\theta$ characteristic correction unit 24, a motor control unit 25, a monitor control unit 26, an in-vehicle device control unit 27, a memory 28, and the like.

First, the rotation angular speed calculation unit 21 will be described.

A signal of a rotation angle $\theta$ (displacement) is input from the rotary encoder 18 to the rotation angular speed calculation unit 21. The rotation angular speed calculation unit 21 calculates a rotation angular speed d$\theta$ (displacement speed) of the commander 11 based on the rotation angle $\theta$ having been input.

It is considered that the muscle activity amount of the driver is large when the rotational angular speed d$\theta$ of the commander 11 is fast, and the muscle activity amount of the driver is small when the rotational angular speed d$\theta$ of the commander 11 is slow. That is, the rotation angular speed calculation unit 21 calculates the rotation angular speed d$\theta$ of the commander 11 to detect the state of the muscle activity of the driver.

Next, the operation unit viscosity characteristic correction unit 22 will be described.

The operation unit viscosity characteristic correction unit 22 is configured to be capable of changing the time constant of the commander viscosity characteristic X (operation unit viscosity characteristic) stored in the memory 28 based on the muscle tonus degree of the driver.

The memory 28 will be described before the description of the operation unit viscosity characteristic correction unit 22.

In the memory 28, initial F-$\theta$ characteristics Wa and Wb and the commander viscosity characteristic X that have been obtained through experiments or the like are stored in advance.

As will be described later, the F-$\theta$ characteristic correction unit 24 sets first and second F-$\theta$ characteristics W1 and W2, which are an intermediate F-$\theta$ characteristic, based on the initial F-$\theta$ characteristics Wa and Wb. Finally, based on the first and second F-$\theta$ characteristics W1 and W2, the F-$\theta$ characteristic correction unit 24 sets a basic F-$\theta$ characteristic W3 for controlling the operation of the motor 19.

Figure 4:
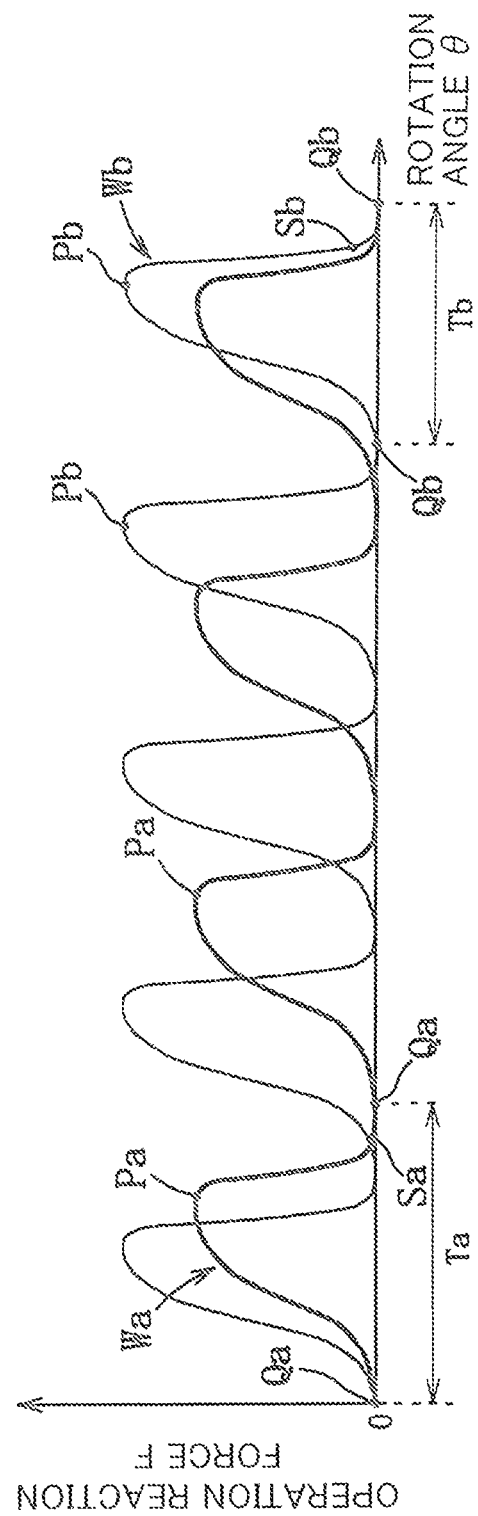
FIG. 4 is a chart showing an initial F-θ characteristic.

As shown in FIG. 4, the initial F-$\theta$ characteristics Wa and Wb are wavy characteristics defined by the rotation angle $\theta$ (operation amount) of the commander 11 on the horizontal axis and the operation reaction force F applied to the commander 11 on the vertical axis. As described later, the F-$\theta$ characteristic correction unit 24 selects one of the initial F-$\theta$ characteristics Wa and Wb.

The initial F-$\theta$ characteristic Wa is composed of a plurality of peak portions that are defined by both bottom portions Qa next to each other in front and rear, a top portion Pa, and a cycle Ta. That is, one peak portion is defined by the front bottom portion Qa, the top portion Pa, and the rear bottom portion Qa in the cycle Ta. The initial F-$\theta$ characteristic Wa has an increasing tendency in which the operation reaction force F increases at a predetermined change rate in the period from the front bottom portion Qa to the rear top portion Pa. The initial F-$\theta$ characteristic Wa has a decreasing tendency of a change rate larger than the change rate described above in the period from the top portion Pa to the rear bottom portion Qa.

The initial F-$\theta$ characteristic Wb is composed of a plurality of peak portions that are defined by both bottom portions Qb next to each other in front and rear, which are the same reaction force as the operation reaction force F of the both bottom portions Qa, a top portion Pb which is a reaction force larger than the operation reaction force F of the top portion Pa, and a cycle Tb (Tb<Ta). The initial F-$\theta$ characteristic Wb has an increasing tendency in which the operation reaction force F increases at a predetermined change rate in the period from the front bottom portion Qb to the rear top portion Pb. The initial F-$\theta$ characteristic Wb has a decreasing tendency of a change rate larger than the change rate described above in the period from the top portion Pb to the rear bottom portion Qb.

Sa and Sb respectively denote switching timings of display contents (screen) of the monitor 7. The switching timings Sa and Sb are set in advance to the initial F-$\theta$ characteristics Wa and Wb, respectively.

Figure 5:
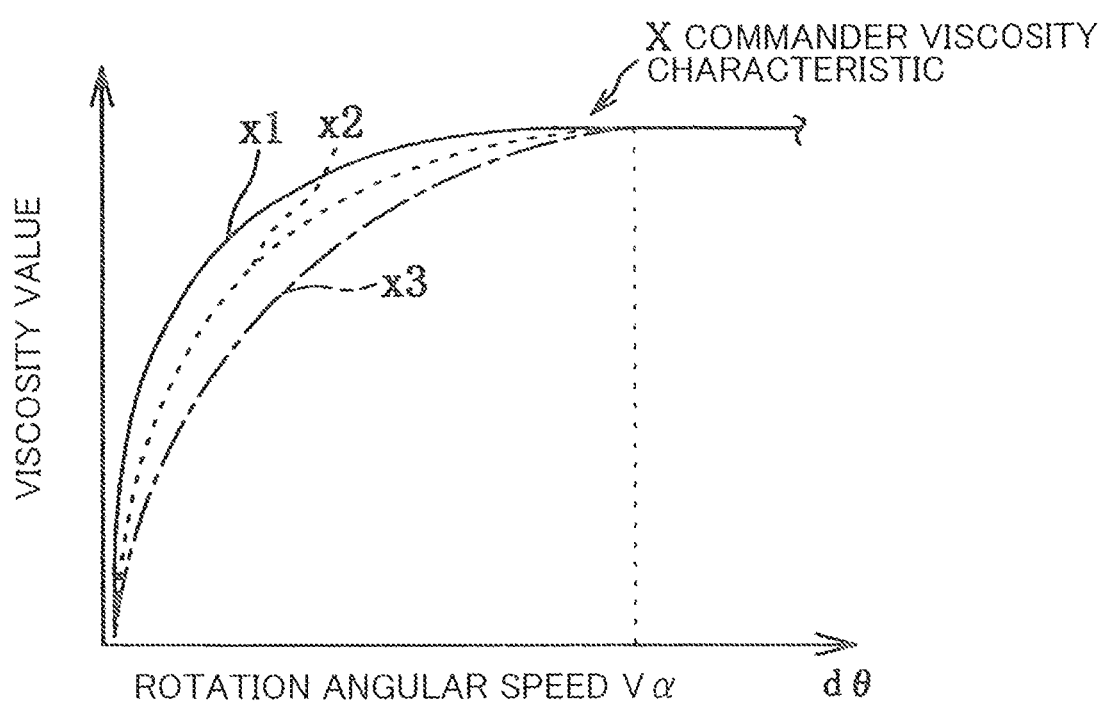
FIG. 5 is a chart showing a commander viscosity characteristic.

As shown in FIG. 5, the commander viscosity characteristic X is a characteristic defined by the rotation angular speed d$\theta$ of the commander 11 on the horizontal axis and the viscosity value corresponding to the differential value of the operation reaction force F of the commander 11 on the vertical axis.

The commander viscosity characteristic X is a characteristic that has a time constant such that the viscosity value increases as the rotation angular speed d$\theta$ increases when the rotation angular speed d$\theta$ is less than a reference rotation angular speed Va, and the viscosity value becomes constant regardless of the rotation angular speed d$\theta$ when the rotation angular speed d$\theta$ is equal to or larger than the reference rotation angular speed Va.

As described later, the increasing tendency of the peak portions of the basic F-$\theta$ characteristic W3 (change rate) is set by the F-$\theta$ characteristic correction unit 24 based on the commander viscosity characteristic X.

Therefore, when the rotation angular speed d$\theta$ is less than the reference rotation angular speed Va, the larger the rotation angular speed d$\theta$ is, the larger the operation reaction force F becomes. That is, when the muscle activity amount of the driver is lower than the muscle activity amount corresponding to the reference rotation angular speed Va and only a small viscous reaction force is generated with respect to the driver based on the muscle viscosity characteristic, the higher the muscle activity amount becomes, the larger the operation reaction force F becomes.

On the other hand, when the rotation angular speed dθ is equal to or larger than the reference rotation angular speed Va, the operation reaction force F becomes constant regardless of the rotation angular speed dθ. That is, when the muscle activity amount of the driver is higher than the muscle activity amount corresponding to the reference rotation angular speed Va and a large viscous reaction force is generated with respect to the driver based on the muscle viscosity characteristic, the operation reaction force F becomes constant regardless of the muscle activity amount.

Therefore, it is possible to give the driver an operation feeling that is appropriate for the muscle viscosity characteristic. This allows the operation reaction force F felt by the driver from the commander 11 to be optimized regardless of the muscle activity.

Figure 6:
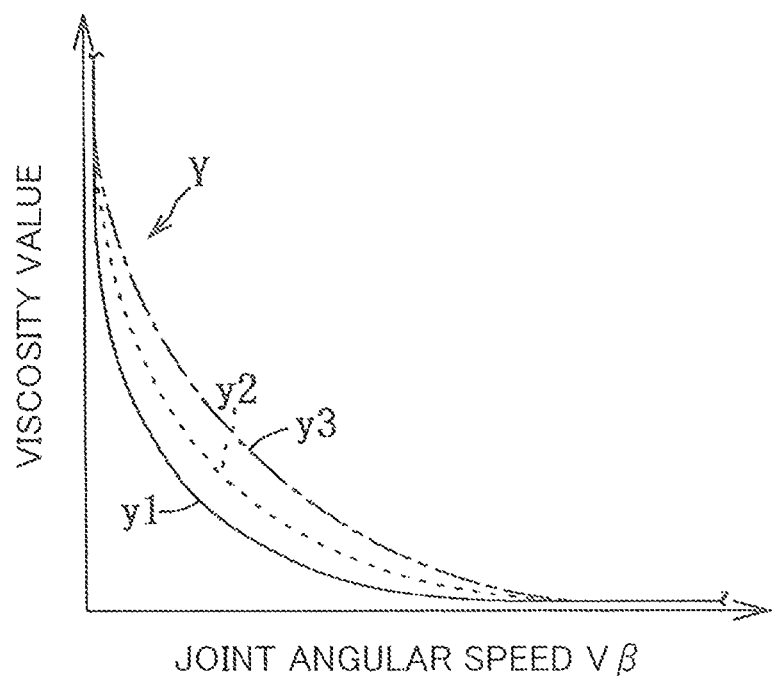
FIG. 6 is a chart showing a muscle viscosity characteristic.

FIG. 6 shows a muscle viscosity characteristic Y, which is a correlation between a joint angular speed and the viscosity value corresponding to the differential value of the operation reaction force F felt by the driver from the commander 11 ergonomically.

A characteristic y2 indicated by a dashed line is a characteristic when the tension of the driver is higher than that of a characteristic y1 indicated by a solid line. A characteristic y3 indicated by a chain line is a characteristic when the tension of the driver is higher than that of the characteristic y2 indicated by the dashed line. The muscle viscosity characteristic Y shows a characteristic in which the curvature of the downward convex shape becomes gentler (the time constant becomes larger) as the muscle tonus degree of the driver is higher, and when the joint angular speed is equal to or higher than a reference joint angular speed Vβ, the viscosity value converges to a constant value regardless of the tension of the driver. That is, the reference joint angular speed Vβ indicates a limit value of the response speed of the muscle spindle.

In the present embodiment, the reference rotation angular speed Va of the commander viscosity characteristic X is set based on the reference joint angular speed Vβ of the muscle viscosity characteristic Y indicating the limit value of the response speed of the muscle spindle.

The description of the operation unit viscosity characteristic correction unit 22 resumes.

As shown in FIG. 3, the operation unit viscosity characteristic correction unit 22 has a muscle tonus estimation unit 22a that estimates the muscle tonus of the driver. The operation unit viscosity characteristic correction unit 22 changes so that the higher the muscle tonus estimated by the muscle tonus estimation unit 22a is, the larger the time constant of the commander viscosity characteristic X becomes.

As shown in FIG. 5, a characteristic x2 indicated by a dashed line is a characteristic when the tension of the driver is higher than that of a characteristic x1 indicated by a solid line. A characteristic x3 indicated by a chain line is a characteristic when the tension of the driver is higher than that of the characteristic x2 indicated by the dashed line. That is, the commander viscosity characteristic X is set to a characteristic having a time constant such that the curvature of the upward convex shape becomes gentler (the time constant becomes larger) as the muscle tonus degree of the driver is higher, and when the rotation angular speed dθ is the reference rotation angular speed Va, the viscosity value converges to a constant value regardless of the tension of the driver.

Therefore, the load acting on the driver during the operation of the commander 11, which corresponds to the sum of the two reaction forces, i.e., the operation reaction force F and the viscous reaction force that is the motion resistance of the driver, can be made substantially constant regardless of the muscle activity of the driver. This can improve the operation feeling of the commander 11.

The muscle tonus estimation unit 22a has an operation experience amount calculation unit 22b.

The operation experience amount calculation unit 22b calculates an operation experience amount indicating the degree of experience of in which the driver operates the commander 11. Specifically, the operation experience amount calculation unit 22b cumulatively counts as the cumulative number of operations of the commander 11 the number of times when the operation of the commander 11 is started by the driver. The operation experience amount calculation unit 22b calculates as the operation experience amount of the commander 11 the cumulative number of operations of the commander 11.

For example, when the rotation angular speed dθ that is not 0 is calculated after a predetermined period of time or more has elapsed since the rotation angular speed dθ calculated by the rotation angular speed calculation unit 21 becomes 0, the operation experience amount calculation unit 22b determines that an operation of the commander 11 has been started by the driver and performs the cumulative count.

When the cumulative number of operations of the commander 11 is large (e.g., the number of times of determination is N or more), it is considered that the driver is familiar with the operation of the commander 11. On the other hand, when the cumulative number of operations of the commander 11 is small (e.g., the number of times of determination is less than N), it is considered that the driver is not familiar with the operation of the commander 11. That is, the muscle tonus estimation unit 22a estimates the muscle tonus for the operation of the commander 11 by the driver, with the cumulative number of operations of the commander 11 calculated by the operation experience amount calculation unit 22b as a parameter.

For example, when the cumulative number of operations of the commander 11 calculated by the operation experience amount calculation unit 22b is equal to or greater than a predetermined amount, it is considered that the driver is familiar with the operation of the commander 11 compared with a case where the cumulative number of operations of the commander 11 is less than the predetermined amount. As described above, when the cumulative number of operations of the commander 11 is equal to or greater than the predetermined amount, the muscle tonus estimation unit 22a estimates that the muscle tonus with respect to the operation of the commander 11 by the driver is low compared with a case where the cumulative number of operations of the commander 11 is less than the predetermined amount.

Next, the holding state determination unit 23 will be described.

The holding state determination unit 23 determines the holding state of the commander 11 by the driver based on an input signal from the pressure sensor 11a.

When the pressing force of the top portion of the commander 11 is high, the palm of the driver contacts the top portion of the commander 11, and the pressure sensor 11a detects a contact pressure equal to or greater than a predetermined pressure. On the other hand, when the pressing force of the top portion of the commander 11 is low, the palm of the driver does not contact the top portion of the commander 11, and hence the pressure sensor 11a does not detect a contact pressure equal to or higher than the predetermined pressure. That is, the holding state determination unit 23 determines the holding state of the commander 11 by the driver with the pressing force of the top portion of the commander 11 indicated by the contact pressure detected by the pressure sensor 11a as a parameter.

For example, when a contact pressure equal to or higher than a predetermined pressure has been detected by the pressure sensor 11a, the holding state determination unit 23 determines that the driver holds the commander 11 from above, i.e., in the upper holding state. On the other hand, when a contact pressure equal to or higher than the predetermined pressure has not been detected by the pressure sensor 11a, the holding state determination unit 23 determines that the driver holds the commander 11 from the side, i.e., in the lateral holding state.

Next, the F-θ characteristic correction unit 24 will be described.

The F-θ characteristic correction unit 24 is configured to be capable of changing the operation reaction force F of the initial F-θ characteristics Wa and Wb stored in the memory 28 and the switching timings Sa and Sb of the display contents.

The F-θ characteristic correction unit 24 sets the first and second F-θ characteristics W1 and W2 using an operation reaction force adjustment function and a cycle adjustment function, and finally sets the basic F-θ characteristic W3 for controlling the operation of the motor 19. Hereinafter, unless otherwise described, the F-θ characteristic W, the waveform cycle T, the waveform top portion P, the waveform bottom portion Q, the display content switching timing S, and the operation reaction force F will be described as symbols representing each of them.

The operation reaction force adjustment function is a function of adjusting the operation reaction force F at the top portion P in a situation of being affected by the muscle viscosity characteristic and in a situation of emphasizing the load perceived by the driver at a predetermined rotation angle θ.

When the driver holds the commander 11 in the upper holding position, many joints are related to the operation, and hence the viscous reaction force based on the muscle viscosity characteristic has a great influence on the load perceived by the driver. Therefore, the F-θ characteristic correction unit 24 reduces the operation reaction force F when the driver holds the commander 11 in the upper holding state compared to when the driver holds the commander 11 in the lateral holding state. Thus, the F-θ characteristic correction unit 24 reduces the influence of the muscle viscosity characteristic based on the holding state of the commander 11 on the load perceived by the driver.

Further, as described above, when the operation experience amount of the commander 11 by the driver is large, the tension of the driver is lower than that when the operation experience amount is small, and hence the influence of the viscous reaction force based on the muscle viscosity characteristic is small on the load perceived by the driver.

Figure 7A:
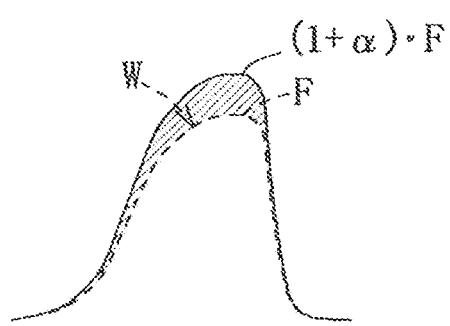
FIG. 7A is a view showing an example of a peak portion of an operation reaction force when an operation experience amount is large.

Therefore, as shown in FIG. 7A, the F-θ characteristic correction unit 24 corrects the operation reaction force F of the top portion P to $(1+\alpha)\times F$ using a correction coefficient $\alpha$ ($0<\alpha$) when the operation experience amount of the commander 11 by the driver is large. Thus, the F-θ characteristic correction unit 24 reduces the influence of the muscle viscoelasticity based on the operation experience on the load perceived by the driver. The operation experience amount calculation unit 22b may calculate the cumulative operation time of the commander 11 as the operation experience amount, not limited to the cumulative number of operations of the commander 11. Alternatively, the operation experience amount calculation unit 22b may simply calculate the travel time or the travel distance of the vehicle as the operation experience amount.

Figure 7B:
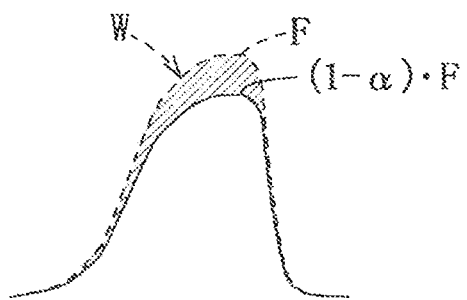
FIG. 7B is a view showing an example of a peak portion of an operation reaction force when an operation experience amount is small.

As shown in FIG. 7B, when the operation experience amount of the commander 11 by the driver is small, the F-θ characteristic correction unit 24 may correct the operation reaction force F of the top portion P to the operation reaction force $(1-\alpha)\times F$ using the correction coefficient $\alpha$.

Figure 8:
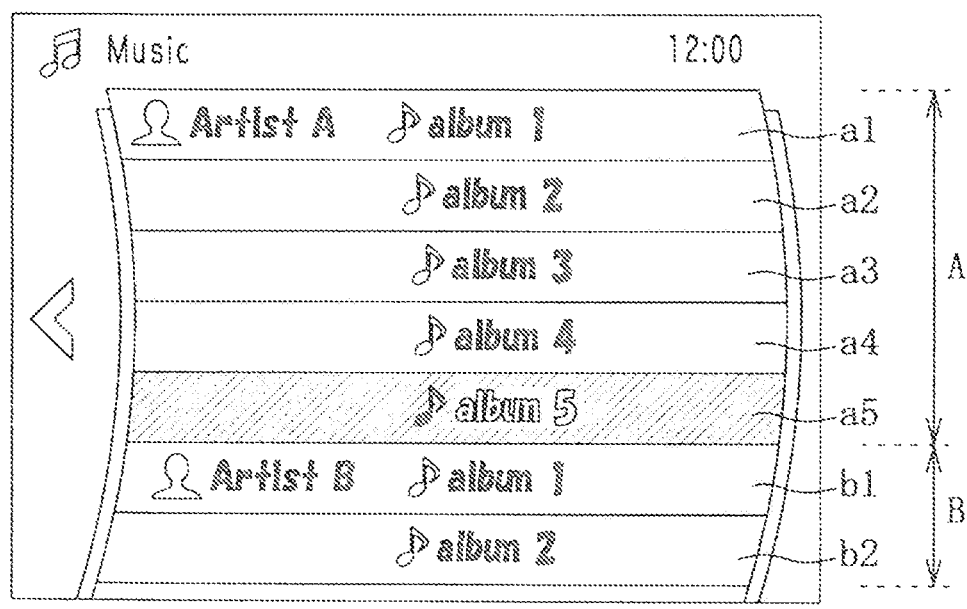
FIG. 8 is an example of display contents.

As shown in FIG. 8, in a situation where a category A including titles a1 to a5 and a category B including titles b1 and b2 are displayed on the monitor 7, it is assumed that the driver scrolls the title (highlighted) selected by a blind operation. In this case, the driver is incapable of visually recognizing the currently selected title position.

Figure 9:
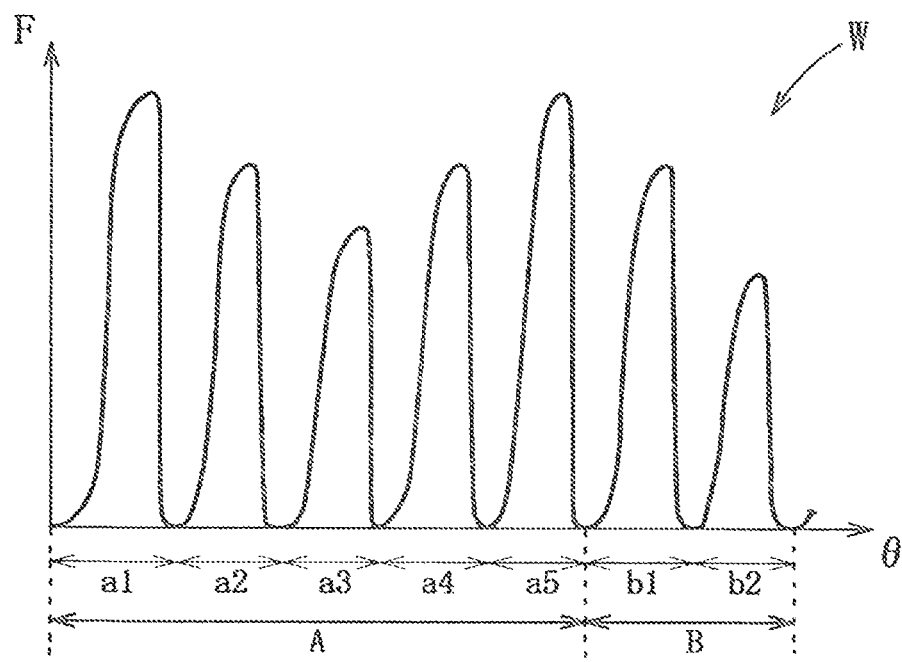
FIG. 9 is an example of the F-θ characteristic including a plurality of categories.

Therefore, as shown in FIG. 9, in the selection operation of the title included in the category A, the F-θ characteristic correction unit 24 sets the maximum value of the operation reaction force F when the driver selects the end titles a1 and a5 located at the head and the tail of the category A to be larger than the maximum value of the operation reaction force F when the driver selects the titles a2 to a4.

The F-θ characteristic correction unit 24 sets the maximum value of the operation reaction force F when the driver selects the title a3 located at the center of the category A to be smaller than the maximum value of the operation reaction force F when the driver selects the titles a2 and a4 next to the title a3.

Similarly, in the selection operation of the title included in the category B, the F-θ characteristic correction unit 24 sets the maximum value of the operation reaction force F when selecting the end title b1 to be smaller than the maximum value of the operation reaction force F when selecting the end title a5 of the category A next to the title b1 and larger than the maximum value of the operation reaction force F when selecting the title b2 next to the title b1. This allows the driver to perceive, haptically through the operation reaction force F, the transition of the category corresponding to the title to be selected.

The cycle adjustment function is a function of adjusting the cycle T of the F-θ characteristic W in a situation where the operation reaction force F corresponding to the holding state of the commander 11 affects the load perceived by the driver.

When the driver holds the commander 11 in the lateral holing state, the driver operates only with the finger joints. Therefore, it is not easy for the driver to operate the commander 11 by rotating it, and the operability of the commander 11 is deteriorated.

Therefore, when the driver holds the commander 11 in the lateral holing state, the F-θ characteristic correction unit 24 reduces the cycle T of the F-θ characteristic W. Thus, the F-θ characteristic correction unit 24 reduces the operation amount of the commander 11 by the driver. On the other hand, the F-θ characteristic correction unit 24 increases the cycle T of the F-θ characteristic W when the driver holds the commander 11 in the upper holding state, compared to when the holding state is in the lateral holding state. Thus, the operability of the commander 11 is maintained regardless of the holding state of the commander 11 by the driver.

Furthermore, the F-θ characteristic correction unit 24 respectively allocates the display contents displayed on the monitor 7 to the peak portions of the F-θ characteristic W, and, in accordance with the rotation angular speed dθ of the commander 11, sets the switching timing S of the display contents of the monitor 7.

In the example shown in FIG. 9, based on the operation amount (rotation angle θ) of the commander 11, the titles a1 to a5, b1, and b2 that can be displayed on the monitor 7 are allocated to the rotation angle θ so that the top portion P of the peak portion of the F-θ characteristic W is included in each display period.

Figure 10:
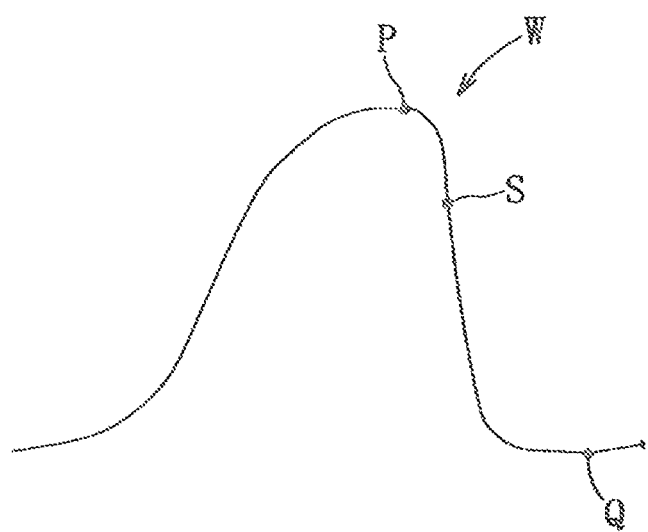
FIG. 10 is an explanatory diagram of switching timing.

In the example shown in FIG. 10, the F-θ characteristic correction unit 24 sets the switching timing S of the titles a1 to a5, b1, and b2 displayed on the monitor 7 to be between the top portion P of the peak portion one cycle before and the rear bottom portion Q continuous to the rear side of the top portion P.

The initial position of the switching timing S is the rear bottom portion Q.

The title displayed on the monitor 7 is continuously displayed by the monitor control unit 26 described later until the commander 11 is operated at the adjacent switching timing S or until the operation of the in-vehicle devices 4 to 6 is started.

The F-θ characteristic correction unit 24 corrects the switching timing S to $(1-k \cdot d\theta) \times S$ using a correction coefficient k ($0<k<1$) in order to shift the switching timing S to the top portion P side as the rotation angular speed dθ of the commander 11 is faster.

Next, the motor control unit 25, the monitor control unit 26, and the in-vehicle device control unit 27 will be described.

The motor control unit 25 outputs to the motor 19 a command signal based on the commander viscosity characteristic X set by the operation unit viscosity characteristic correction unit 22 and the basic F-θ characteristic W3 set by the F-θ characteristic correction unit 24. Thus, the motor control unit 25 applies the operation reaction force F to the commander 11 in accordance with the manual operation amount of the driver.

The monitor control unit 26 displays the selected menu screen on the monitor 7 when the driver presses any of the selection switches 12 to 15. When the commander 11 is operated by the driver while a predetermined menu screen is displayed, the monitor control unit 26 outputs to the monitor 7 a command signal based on the switching timing S of the basic F-θ characteristic W3 set by a waveform setting unit 24. Thus, the monitor control unit 26 displays on the monitor 7 a title (display contents) corresponding to the manual operation amount of the driver.

When the driver decides the selected title by the pressing operation of the decision switch 16, the in-vehicle device control unit 27 outputs to the in-vehicle device a command signal for executing the functional operation of the in-vehicle device corresponding to the selected title.

Next, the operation reaction force control of the operation device 10 will be described with reference to the flowcharts of FIGS. 11 to 13. Si (i=1, 2 . . . ) denotes steps for each processing.

Figure 11:
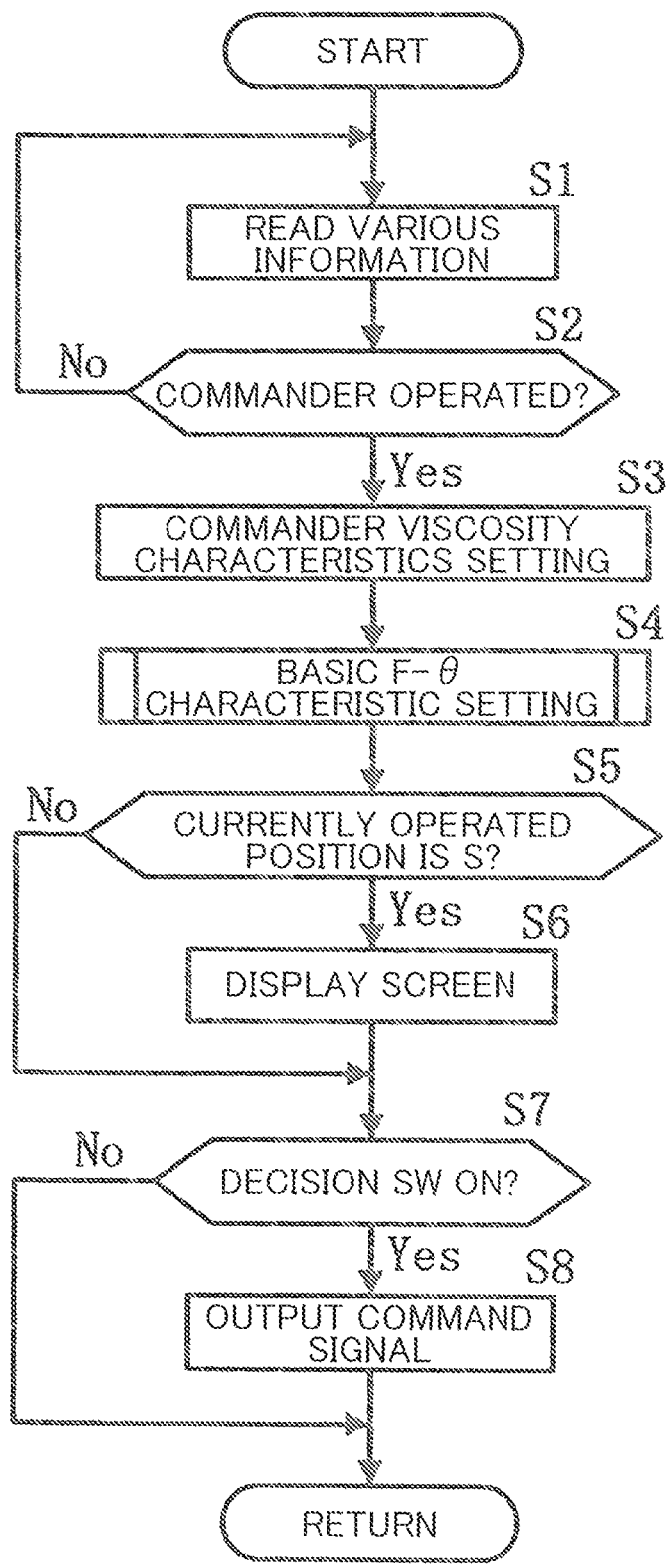
FIG. 11 is a flowchart of operation reaction force control processing.

As shown in the flowchart of FIG. 11, first, in the operation reaction force control processing, the ECU 20 reads (step S1) the output values of the pressure sensor 11a and the rotary encoder 18 and various information such as the initial F-θ characteristics Wa and Wb and the commander viscosity characteristic X, and causes the process to proceed to step S2.

In step S2, the ECU 20 determines whether the commander 11 has been operated.

For example, in step S2, the ECU 20 determines whether the commander 11 has been operated based on whether the rotation angular speed dθ calculated by the rotation angular speed calculation unit 21 is not 0.

If it is determined in step S2 that the commander 11 has been operated, the ECU 20 causes the processing to proceed to step S3. In step S3, the operation unit viscosity characteristic correction unit 22 performs processing (commander viscosity characteristics setting process) for changing the time constant of the commander viscosity characteristic X based on the rotation angular speed dθ and the operation experience amount, as described above.

If it is determined in step S2 that the commander 11 has not been operated, the ECU 20 causes the processing to return to step S1 and continues to read information.

In step S4, the F-θ characteristic correction unit 24 performs the processing of setting the basic F-θ characteristic W3 (basic F-θ characteristic setting processing) as described above, and causes the processing to proceed to step S5.

In step S5, the monitor control unit 26 determines whether the commander 11 is currently operated to a position (rotation angle θ) corresponding to the switching timing S in the basic F-θ characteristic W3.

As a result of the determination in step S5, if the monitor control unit 26 determines that the commander 11 is operated to a position corresponding to the switching timing S, the monitor control unit 26 displays a corresponding display screen (title) (step S6), and causes the processing to proceed to step S7. As a result of the determination in step S5, when the monitor control unit 26 determines that the commander 11 is not operated to the position corresponding to the switching timing S, the monitor control unit 26 causes the processing to proceed to step S7.

In step S7, the in-vehicle device control unit 27 determines whether the decision switch 16 has been pressed.

It is assumed that as a result of the determination in step S7, the in-vehicle device control unit 27 determines that the decision switch 16 has been pressed. In this case, the in-vehicle device control unit 27 outputs to the in-vehicle device (step S8) a command signal for causing the in-vehicle device to execute the function of the in-vehicle device corresponding to the title selected by the driver, and causes the processing to return to step S1. As a result of the determination in step S7, if the in-vehicle device control unit 27 determines that the decision switch 16 has not been pressed, the in-vehicle device control unit 27 causes the processing to return to step S1.

Next, the basic F-θ characteristic setting processing in step S4 will be described.

Figure 12:
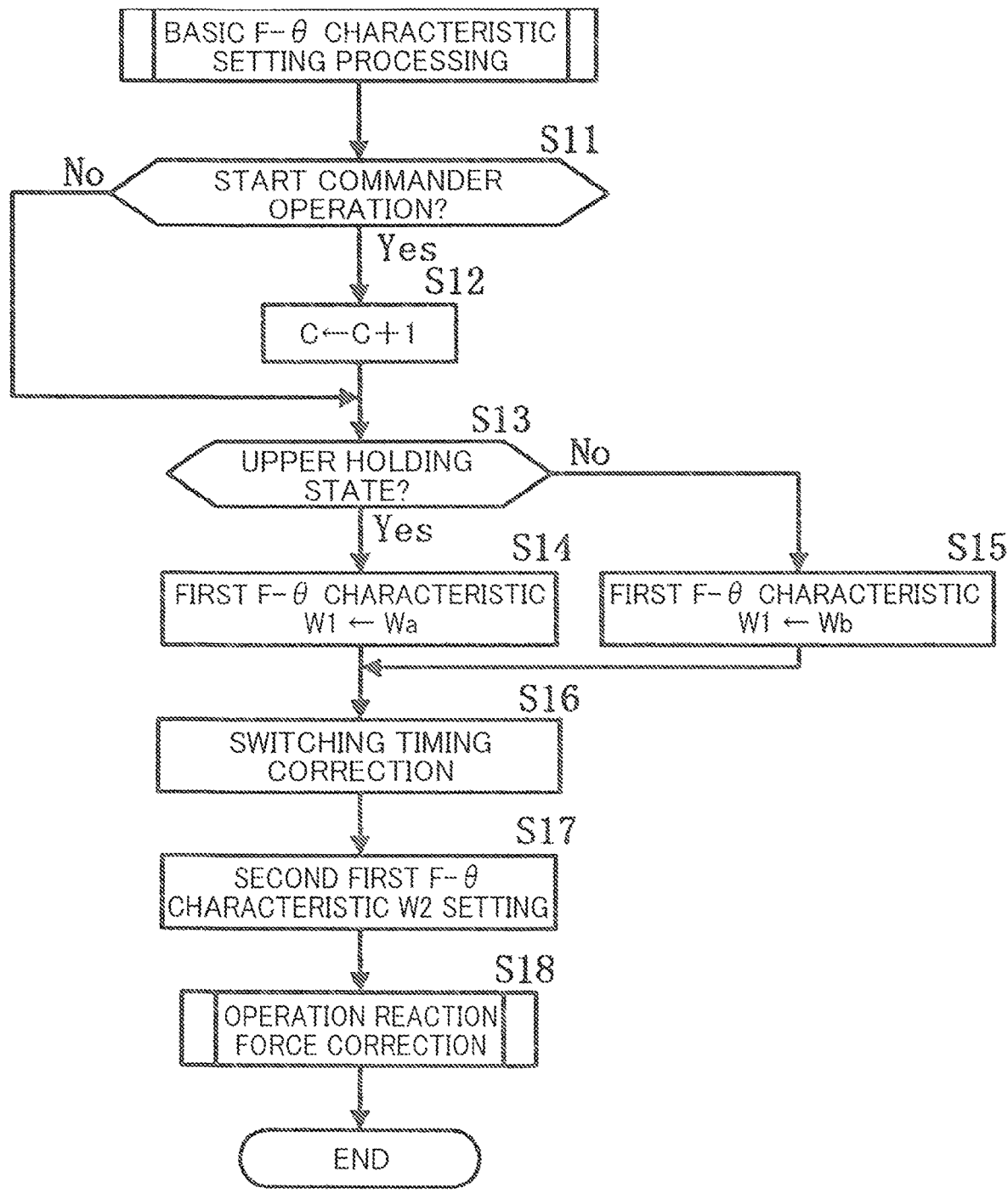
FIG. 12 is a flowchart of basic F-θ characteristic setting processing.

As shown in the flowchart of FIG. 12, in the basic F-θ characteristic setting processing, first, in step S11, the operation experience amount calculation unit 22b determines whether the operation of the commander 11 by the driver has been started, as described above.

As a result of the determination in step S11, if the operation experience amount calculation unit 22b determines that the operation of the commander 11 has been started, the operation experience amount calculation unit 22b adds 1 to the value of a counter C of the cumulative number of operations of the commander 11 (step S12), and causes the processing to proceed to step S13. As a result of the determination in step S11, if the operation experience amount calculation unit 22b determines that the operation of the commander 11 has not been started, the operation experience amount calculation unit 22b causes the processing to proceed to step S13 on the assumption that the operation of the commander 11 by the driver is continuing.

In step S13, the holding state determination unit 23 determines whether the holding state of the commander 11 by the driver is the upper holding state.

If it is determined in step S13 that the holding state of the commander 11 by the driver is the upper holding state, the F-θ characteristic correction unit 24 sets the initial F-θ characteristic Wa (FIG. 4) as the first F-θ characteristic W1 (step S14), and causes the processing to proceed to step S16.

If it is determined in step S13 that the holding state of the commander 11 by the driver is not the upper holding state, the F-θ characteristic correction unit 24 determines that the holding state of the commander 11 by the driver is the lateral holding state, sets the initial F-θ characteristic Wb (FIG. 4) as the first F-θ characteristic W1 (step S15), and causes the processing to proceed to step S16.

In step S16, as described above, the F-θ characteristic correction unit 24 corrects the switching timing S of the first F-θ characteristic W1 so as to shift the switching timing S to the top portion P side as the rotation angular speed dθ of the commander 11 is faster.

In step S17, the F-θ characteristic correction unit 24 sets, as the second F-θ characteristic W2, the first F-θ characteristic W1 in which the operation reaction force F and the switching timing S have been corrected, and causes the processing to proceed to step S18.

In step S18, the F-θ characteristic correction unit 24 corrects the operation reaction force F, and ends the processing.

Next, the processing of correcting the operation reaction force F in step S18 will be described.

Figure 13:
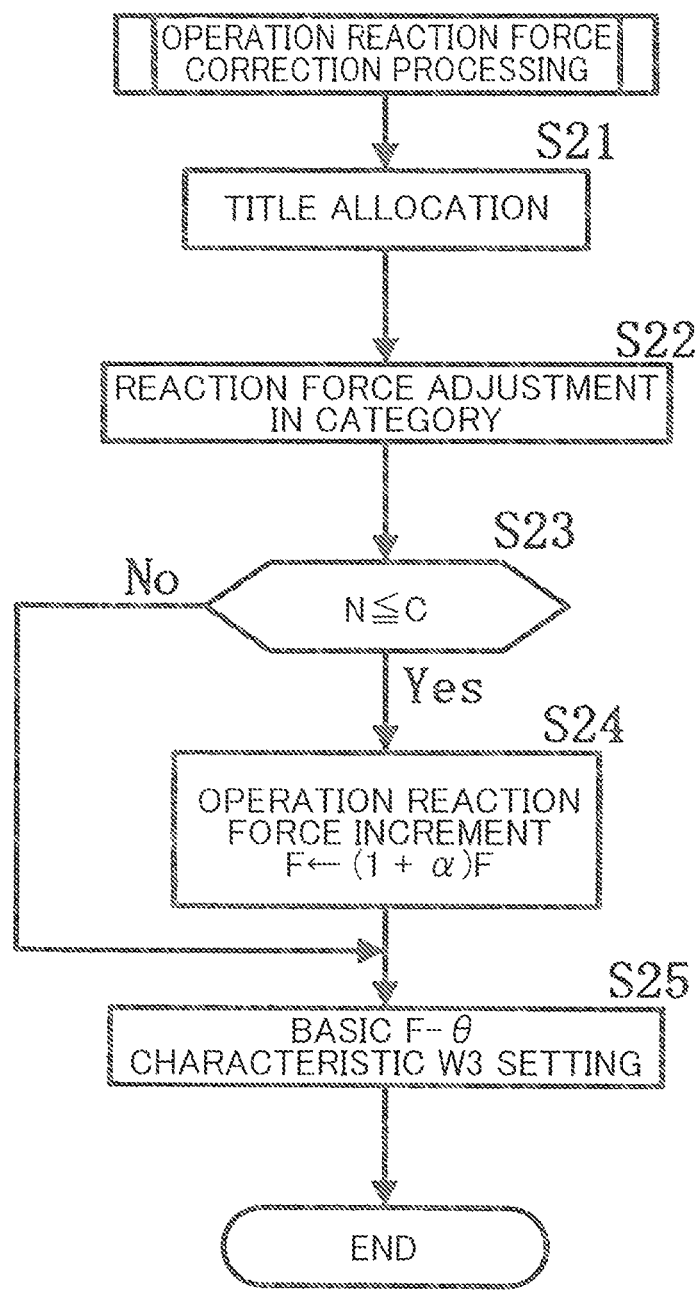
FIG. 13 is a flowchart of operation reaction force correction processing.

As shown in the flowchart of FIG. 13, in the processing of correcting the operation reaction force F, first, in step S21, the F-θ characteristic correction unit 24, as shown in FIG. 9, allocates a plurality of titles (contents) included in each category to the peak portions of the second F-θ characteristic W2, and causes the processing to proceed to step S22.

In step S22, the F-θ characteristic correction unit 24 adjusts the operation reaction force F when each title in the category is selected so that the maximum operation reaction force F (operation reaction force F at the top portion P) corresponding to the title increases as the title is positioned on the end side with respect to the center portion of the monitor 7 in the same category. Then, the F-θ characteristic correction unit 24 causes the processing to proceed to step S23.

In step S23, the F-θ characteristic correction unit 24 determines whether the counter C after the addition in step S12 indicates the number of determination times N or more.

It is assumed that as a result of the determination in step S23, the F-θ characteristic correction unit 24 determines that the counter C indicates the number of determination times N or more. In this case, the operation experience amount of the commander 11 by the driver is large, and hence the F-θ characteristic correction unit 24 incrementally corrects the operation reaction force F of the top portion P of each peak portion of the second F-θ characteristic W2 to (1+α)×F, respectively, and causes the processing to proceed to step S25.

If it is determined in step S23 that the counter C indicates the number of determination times of less than N, the F-θ characteristic correction unit 24 causes the processing to proceed to step S25 without increasing the operation reaction force F of the top portion P of each peak portion of the second F-θ characteristic W2 because the operation experience amount of the commander 11 by the driver is small.

In step S25, the F-θ characteristic correction unit 24 sets the corrected second F-θ characteristic W2 to the basic F-θ characteristic W3, and ends the processing.

Next, the operations and effects of the operation device 10 for vehicle of the present embodiment will be described.

According to the operation device 10, the motor 19 that applies the operation reaction force F to the commander 11 at each predetermined rotation angle θ of the commander 11 is provided. Therefore, it is possible to appropriately give the driver an operation feeling of the commander 11.

The ECU 20 changes the operation reaction force F in accordance with the rotation angular speed dθ detected by the rotation angular speed calculation unit 21. This allows the operation reaction force F felt by the driver to be optimized regardless of the rotation angular speed dθ of the commander 11. This is capable of eliminating the sense of incongruity from the driver.

Since the ECU 20 changes the operation reaction force F in accordance with the rotation angular speed dθ detected by the rotation angular speed calculation unit 21 so that the load acting on the driver at the time of operating the commander 11 becomes constant, the operation feeling of the commander 11 can be improved.

Since the larger the rotation angular speed dθ detected by the rotation angular speed calculation unit 21 is, the more the ECU 20 increases the operation reaction force F, it is possible to give the driver an appropriate operation feeling.

The memory 28 is included for storing the commander viscosity characteristic X that has been set with the operation reaction force F applied to the commander 11 and the rotation angular speed dθ of the commander 11 as parameters. The ECU 20 changes the operation reaction force F so that the load applied to the driver at the time of operating the commander 11, which is determined by the commander viscosity characteristic X and the muscle viscosity characteristic of the driver, becomes constant. Therefore, the load acting on the driver can be kept constant regardless of the muscle activity of the driver. This can improve the operation feeling of the commander 11.

The commander viscosity characteristic X is a characteristic that has a time constant at which when the rotation angular speed dθ is less than the reference rotation angular speed Va, the larger the rotation angular speed dθ is, the larger the operation reaction force F becomes, and when the rotation angular speed dθ is equal to or greater than the reference rotation angular speed Va, the operation reaction force F becomes constant regardless of the rotation angular speed dθ. Therefore, it is possible to give the driver an appropriate operation feeling.

The ECU 20 has the operation unit viscosity characteristic correction unit 22 that changes the time constant of the commander viscosity characteristic X. Therefore, it is possible to obtain the commander viscosity characteristic X that matches the muscle viscosity characteristic of the driver through the time constant.

The operation unit viscosity characteristic correction unit 22 has the muscle tonus estimation unit 22a that estimates the muscle tonus of the driver, and changes the operation reaction force F so that the higher the muscle tonus estimated by the muscle tonus estimation unit 22a is, the larger the time constant of the commander viscosity characteristic X becomes. Therefore, it is possible to obtain the commander viscous characteristic X that matches the muscle tonus of the driver.

The muscle tonus estimation unit 22a estimates the muscle tonus based on the operation experience amount of the commander 11 by the driver. Specifically, the muscle tonus estimation unit 22a estimates that when the operation experience amount of the commander 11 by the driver is a predetermined amount or more, the muscle tonus is lower than that when the operation experience amount of the commander 11 is less than the predetermined amount. Therefore, the muscle tonus can be estimated with the operation experience amount of the commander 11 as a parameter.

The ECU 20 changes the operation reaction force F in accordance with the muscle tonus estimated by the muscle tonus estimation unit 22a based on the operation experience amount of the commander 11. Therefore, it is possible to obtain the commander viscous characteristic X that further matches the muscle tonus of the driver through the operation experience amount of the commander 11.

Next, variations in which the above embodiment is partially modified will be described.

1] In the above embodiment, the example is described in which the operation device 10 includes the audio, the air conditioner, and the navigation system as in-vehicle devices, and controls these devices using the commander. However, the operation device 10 may be configured to control at least any one of these in-vehicle devices or to control another in-vehicle device.

2] In the above embodiment, the example is described in which the commander 11 is a commander switch that is rotatable about the fixed rotation shaft. However, the operation device 10 may include a switch function capable of being displaced along a predetermined operation trajectory by at least a manual operation by the driver. For example, the operation device 10 may include a slider-type switch that can slide along a linear motion trajectory or a joystick-type switch, instead of the commander 11. In this case, the rotation shaft may be formed so as to be tiltable in the front-rear and right-left directions.

Furthermore, in place of the commander 11, it is also possible to apply a multi-function commander with which the rotation shaft can be stroked on a straight line.

3] In the above embodiment, the example is described in which the F-θ characteristic correction unit 24 sets the F-θ characteristic by calculation using the rotation angular speed θ and the commander viscosity characteristic X. However, a plurality of F-θ characteristics in which the commander viscosity characteristics are taken into consideration for each rotation angular speed may be held as maps. In accordance with this, the F-θ characteristic correction unit 24 may selectively extract any of the plurality of maps.

4] In the above embodiment, the example is described in which the muscle tonus estimation unit 22a estimates the muscle tonus based on the operation experience amount of the commander 11. However, the muscle tonus estimation unit 22a may estimate the muscle tonus based on the holding state of the commander 11 by the driver instead of the operation experience amount. Specifically, if the holding state determination unit 23 determines that the driver holds the commander 11 in the lateral holing state, the muscle tonus estimation unit 22a may estimate that the muscle tonus is lower than that when the holding state is determined to be the upper holding state.

It is also possible to estimate the muscle tonus with the sheet height and the sheet slide amount as parameters.

According to the present aspect, it is possible to estimate the muscle tonus with the holding state of the commander 11 by the driver or the like as a parameter.

5] In the above embodiment, the example is described in which, using a predetermined determination times N, the F-θ characteristic correction unit 24 increases the operation reaction force F when the operation experience amount is large and maintains the operation reaction force F when the operation experience amount is small. However, the F-θ characteristic correction unit 24 may reduce the operation reaction force F when the operation experience amount is small.

The F-θ characteristic correction unit 24 may linearly increase the operation reaction force F based on an increase in the operation experience amount.

6] In addition, those skilled in the art can carry out the present invention in embodiments in which various modifications are added to the above embodiments or a combination of the embodiments without departing from the scope of the present invention, and the present invention also includes such modifications.

Summary of Present Embodiment

An operation device for a vehicle according to the first aspect of the present invention is an operation device for a vehicle in which an in-vehicle device is controlled in accordance with an operation amount of an input unit which is manually operated by a driver, the operation device including: an operation unit that can be displaced along a predetermined operation trajectory by a manual operation of the driver; a displacement speed detection unit that detects a displacement speed of the operation unit; a reaction force application unit that applies an operation reaction force to the operation unit for each predetermined operation amount of the operation unit; and a control unit that controls an operation reaction force applied by the reaction force application unit, wherein: the control unit changes the operation reaction force in accordance with a displacement speed that is detected by the displacement speed detection unit.

In this aspect, a reaction force application unit that applies an operation reaction force to the operation unit for each predetermined operation amount of the operation unit is included. As a result, it is possible to give the driver an appropriate operation feeling of the operation unit.

The control unit changes the operation reaction force in accordance with a displacement speed that is detected by the displacement speed detection unit. Therefore, the operation reaction force felt by the driver can be optimized regardless of the displacement speed of the operation unit. This is capable of eliminating the sense of incongruity from the driver.

In the first aspect, it is preferable that the control unit changes the operation reaction force in accordance with to the displacement speed detected by the displacement speed detection unit so that the load acting on the driver at the time of operating the operation unit becomes constant.

According to the present aspect, since the operation reaction force is changed so that the load acting on the driver at the time of operating the operation unit becomes constant, the operation feeling of the operation unit can be improved.

In the above aspect, it is preferable that the larger the displacement speed detected by the displacement speed detection unit is, the more the control unit increases the operation reaction force.

According to the present aspect, an appropriate operation feeling can be given to the driver because the larger the displacement speed detected by the displacement speed detection unit is, the larger the operation reaction force is made.

In the first aspect, it is preferable to further include a memory that stores an operation unit viscosity characteristic that has been set with the operation reaction force applied to the operation unit and the displacement speed of the operation unit as parameters, and the control unit changes the operation reaction force so that the load acting on the driver at the time of operating the operation unit, which is determined by the operation unit viscosity characteristic and the muscle viscosity characteristic of the driver, becomes constant.

According to this aspect, the load acting on the driver can be kept constant regardless of the muscle activity of the driver. This can improve the operation feeling of the operation unit.

In the above aspect, it is preferable that the operation unit viscosity characteristic is a characteristic that has a time constant such that when the displacement speed is less than the reference displacement speed, the larger the displacement speed is, the larger the operation reaction force becomes, and when the displacement speed is equal to or greater than the reference displacement speed, the operation reaction force becomes constant regardless of the displacement speed.

According to this aspect, it is possible to give the driver an appropriate operation feeling.

In the above aspect, it is preferable that the control unit has the operation unit viscosity characteristic correction unit that changes the time constant of the operation unit viscosity characteristic.

According to this aspect, it is possible to obtain the operation unit viscosity characteristic that matches the muscle viscosity characteristic of the driver through the time constant.

In the above aspect, it is preferable that the operation unit viscosity characteristic correction unit has a muscle tonus estimation unit that estimates the muscle tonus of the driver, and changes the operation reaction force so that the higher the muscle tonus estimated by the muscle tonus estimation unit is, the larger the time constant of the operation unit viscosity characteristic becomes.

According to this aspect, it is possible to obtain the operation unit viscosity characteristic that matches the muscle tonus of the driver.

In the above aspect, it is preferable that the muscle tonus estimation unit estimates that when the operation experience amount of the operation unit by the driver is a predetermined amount or more, the muscle tonus is lower than that when the operation experience amount of the operation unit is less than the predetermined amount.

According to this aspect, it is possible to estimate the muscle tonus with the operation experience amount of the operation unit by the driver as a parameter.

Alternatively, in the above aspect, it is preferable to further includes: a pressure sensor that detects a contact pressure of the operation unit by the palm of the driver; and a holding state determination unit that determines, based on the contact pressure of the operation unit detected by the pressure sensor, whether the holding state of the operation unit by the driver is the upper holding state in which the operation unit is held from above or the lateral holding state in which the operation unit is held from lateral, wherein: when the holding state of the operation unit is determined to be the lateral holding state by the holding state determination unit, the muscle tonus estimation unit estimates that the muscle tonus is lower than that when the holding state of the operation unit is determined to be the upper holding state by the holding state determination unit.

According to this aspect, it is possible to estimate the muscle tonus with the holding state of the operation unit by the driver as a parameter.

In the above aspect, the control unit may change the operation reaction force in accordance with the muscle tonus estimated by the muscle tonus estimation unit based on the operation experience amount of the operation unit.

According to this aspect, it is possible to obtain the operation unit viscosity characteristic that further matches the muscle tonus of the driver through the operation experience amount of the operation unit.

The invention claimed is:

1. An operation device for a vehicle in which an in-vehicle device is controlled in accordance with an operation amount of an input unit which is manually operated by a driver, the operation device comprising:
   an operation unit that is displaceable along a predetermined operation trajectory by a manual operation of a driver;
   a displacement speed detection unit that detects a displacement speed of the operation unit;
   a reaction force application unit that applies an operation reaction force to the operation unit for each predetermined operation amount of the operation unit;
   a control unit that controls an operation reaction force applied by the reaction force application unit; and
   a memory that stores an operation unit viscosity characteristic that has been set with an operation reaction force applied to the operation unit and a displacement speed of the operation unit as parameters, wherein:
   the control unit changes the operation reaction force in accordance with a displacement speed that is detected by the displacement speed detection unit,
   the control unit changes the operation reaction force so that a load that acts on a driver at a time of operating the operation unit, which is determined by the operation unit viscosity characteristic and a muscle viscosity characteristic of a driver, becomes constant, and
   the operation unit viscosity characteristic is a characteristic that has a time constant such that when a displacement speed is less than a reference displacement speed, the larger a displacement speed is, the larger an operation reaction force becomes, and when a displacement speed is equal to or greater than a reference displacement speed, an operation reaction force becomes constant regardless of a displacement speed.

2. The operation device according to claim 1, wherein the control unit changes the operation reaction force in accordance with a displacement speed that is detected by the displacement speed detection unit so that a load that acts on a driver at a time of operating the operation unit becomes constant.

3. The operation device according to claim 2, wherein the larger a displacement speed detected by the displacement speed detection unit is, the more the control unit increases the operation reaction force.

4. The operation device according to claim 1, wherein the control unit has an operation unit viscosity characteristic correction unit that changes a time constant of the operation unit viscosity characteristic.

5. The operation device according to claim 4, wherein the operation unit viscosity characteristic correction unit has a muscle tonus estimation unit that estimates a muscle tonus of a driver, and changes the operation reaction force so that the higher the muscle tonus estimated by the muscle tonus estimation unit is, the larger a time constant of the operation unit viscosity characteristic becomes.

6. The operation device according to claim 5, wherein the muscle tonus estimation unit estimates that when an operation experience amount of the operation unit by a driver is a predetermined amount or more, the muscle tonus is lower than that when an operation experience amount of the operation unit is less than the predetermined amount.

7. The operation device according to claim 5, further comprising:
   a pressure sensor that detects a contact pressure of the operation unit by a palm of a driver; and
   a holding state determination unit that determines, based on the contact pressure detected by the pressure sensor, whether a holding state of the operation unit by a driver is an upper holding state in which the operation unit is held from above or a lateral holding state in which the operation unit is held from lateral, wherein:
   when a holding state of the operation unit is determined to be the lateral holding state by the holding state determination unit, the muscle tonus estimation unit estimates that the muscle tonus is lower than that when a holding state of the operation unit is determined to be the upper holding state by the holding state determination unit.

8. The operation device according to claim 5, wherein the control unit changes the operation reaction force in accordance with the muscle tonus estimated by the muscle tonus estimation unit based on an operation experience amount of the operation unit.

* * * * *